(12) United States Patent
Mizutani

(10) Patent No.: US 7,791,243 B2
(45) Date of Patent: Sep. 7, 2010

(54) DIRECT CURRENT MOTOR

(75) Inventor: Nobuo Mizutani, Toyohashi (JP)

(73) Assignee: ASMO Co., Ltd., Kosai-Shi, Shizuoka-Ken (JP)

( * ) Notice: Subject to any disclaimer, the term of this patent is extended or adjusted under 35 U.S.C. 154(b) by 206 days.

(21) Appl. No.: 12/036,774

(22) Filed: Feb. 25, 2008

(65) Prior Publication Data

US 2008/0203836 A1    Aug. 28, 2008

(30) Foreign Application Priority Data

Feb. 28, 2007    (JP)    ............... 2007-050819

(51) Int. Cl.
*H02K 5/14*    (2006.01)
(52) U.S. Cl. .............. 310/242; 310/71; 310/75 R; 310/83; 310/238
(58) Field of Classification Search .......... 310/71, 310/83, 90, 242, 75 R
See application file for complete search history.

(56) References Cited

U.S. PATENT DOCUMENTS

| | | | |
|---|---|---|---|
| 5,066,878 A | * | 11/1991 | Sekine et al. ............. 310/68 C |
| 5,444,315 A | * | 8/1995 | Adam et al. .................. 310/71 |
| 5,453,646 A | | 9/1995 | Gleixner et al. |
| 5,942,822 A | | 8/1999 | Iwata et al. |
| 6,242,824 B1 | * | 6/2001 | Torii et al. .................. 310/420 |
| 6,573,625 B2 | * | 6/2003 | Shimizu et al. ............... 310/71 |
| 7,109,617 B2 | * | 9/2006 | Mizutani et al. ............. 310/71 |

FOREIGN PATENT DOCUMENTS

| | | |
|---|---|---|
| JP | 2002165419 A | 6/2002 |
| JP | 2003-79109 A | 3/2003 |
| JP | 2005-302961 A | 10/2005 |
| JP | 2007-028693 A | 1/2007 |

* cited by examiner

*Primary Examiner*—Burton Mullins
(74) *Attorney, Agent, or Firm*—Carstens & Cahoon LLP

(57) ABSTRACT

A gear housing accommodates a worm shaft. A brush holder includes a base member and a retaining member loosely fitted to the base member. The base member is located between the gear housing and the retaining member. The retaining member retains a first brush and a second brush. The retaining member has a pair of positioning poles, and the gear housing has a pair of positioning projections. The positioning poles and the positioning projections are engaged with each other so as to prevent the retaining member from being moved in a direction perpendicular to the axial direction of the rotary shaft.

5 Claims, 8 Drawing Sheets

Fig. 7A
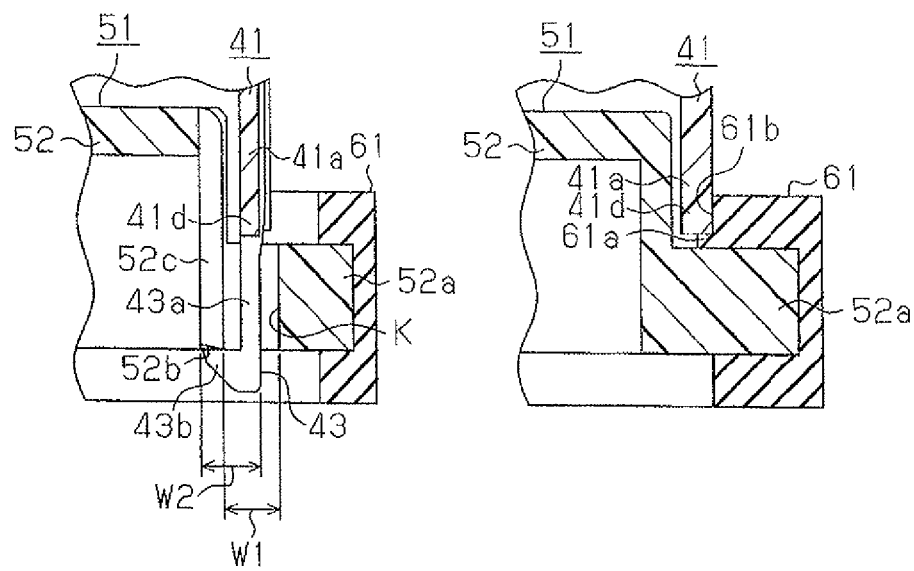
Fig. 7B
Fig. 8
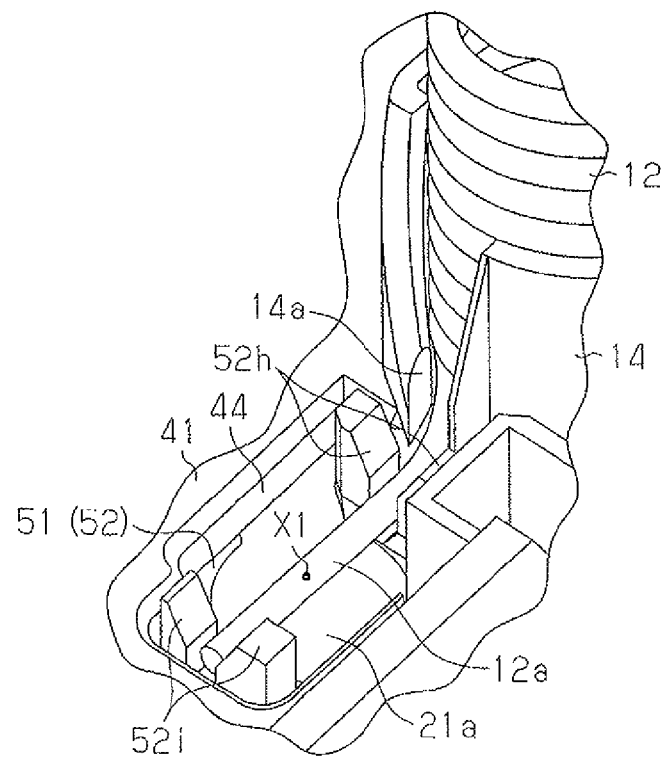

DIRECT CURRENT MOTOR

BACKGROUND OF THE INVENTION

The present invention relates to a direct-current motor having a brush holder.

A brush holder disclosed in Japanese Laid-Open Patent Publication No. 2003-79109 is an integrally molded object including a brush retaining portion, a component retaining portion, and a connector portion. The component retaining portion retains an electrical component such as a choke coil electrically connected to a brush.

Such a brush holder is sandwiched between a yoke housing of a motor main body and a gear housing of a speed reducing mechanism.

When the brush holder is an integrally molded object, molding of the brush retaining portion can be difficult depending on the position of the connector portion with respect to the brush retaining portion. For example, when the connector portion is arranged in the vicinity of the brush retaining portion, which is cylindrical and extends in the radial direction, a slide core for molding the brush retaining portion can interfere with the connector portion. If the distance between the brush retaining portion and the connector portion is set to be sufficient to avoid such interference, size reduction of the brush holder is difficult. Also, when the position of the connector portion with respect to the brush retaining portion is different among several brush holders, a mold is required for each brush holder to manufacture the entire brush holders.

SUMMARY OF THE INVENTION

Accordingly, it is an objective of the present invention to provide a brush holder that is easily miniaturized regardless of the position of the connector portion with respect to the brush retaining portion.

In accordance with one aspect of the present invention, a direct-current motor having a yoke housing and a rotary shaft rotatably accommodated in the yoke housing is provided. The direct-current motor includes a gear housing fixed to the yoke housing and a speed reducing mechanism accommodated in the gear housing. The speed reducing mechanism reduces rotation speed of the rotary shaft and transmits the rotation. A commutator is secured to the rotary shaft to rotate integrally with the rotary shaft. A brush slides against the commutator. A brush holder retains the brush. The brush holder has a retaining member that retains the brush and is accommodated in the yoke housing. The retaining member and the gear housing each have a positioning portion. The positioning portions are engaged with each other so as to prevent the retaining member and the gear housing from being moved with respect to the each other in a direction perpendicular to the axial direction of the rotary shaft. A base member is loosely fitted to the retaining member. The base member is located between the gear housing and the retaining member. The base member has a connector portion.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 7A is a cross-sectional view taken along line 7A-7A of FIG. 2, and shows a state where the engaging pawl is engaged with the engaging wall portions;

FIG. 7B is a cross-sectional view taken along line 7B-7B of FIG. 2, and shows a state where the retaining member and the base member sandwich the sandwiched parts;

FIG. 8 is an enlarged perspective view illustrating the first coil terminal support portion, which support the first coil terminal of FIG. 2;

DESCRIPTION OF THE PREFERRED EMBODIMENTS

FIGS. 1 to 11 show a direct-current motor 1 according to a first embodiment of the present invention.

Figure 1:
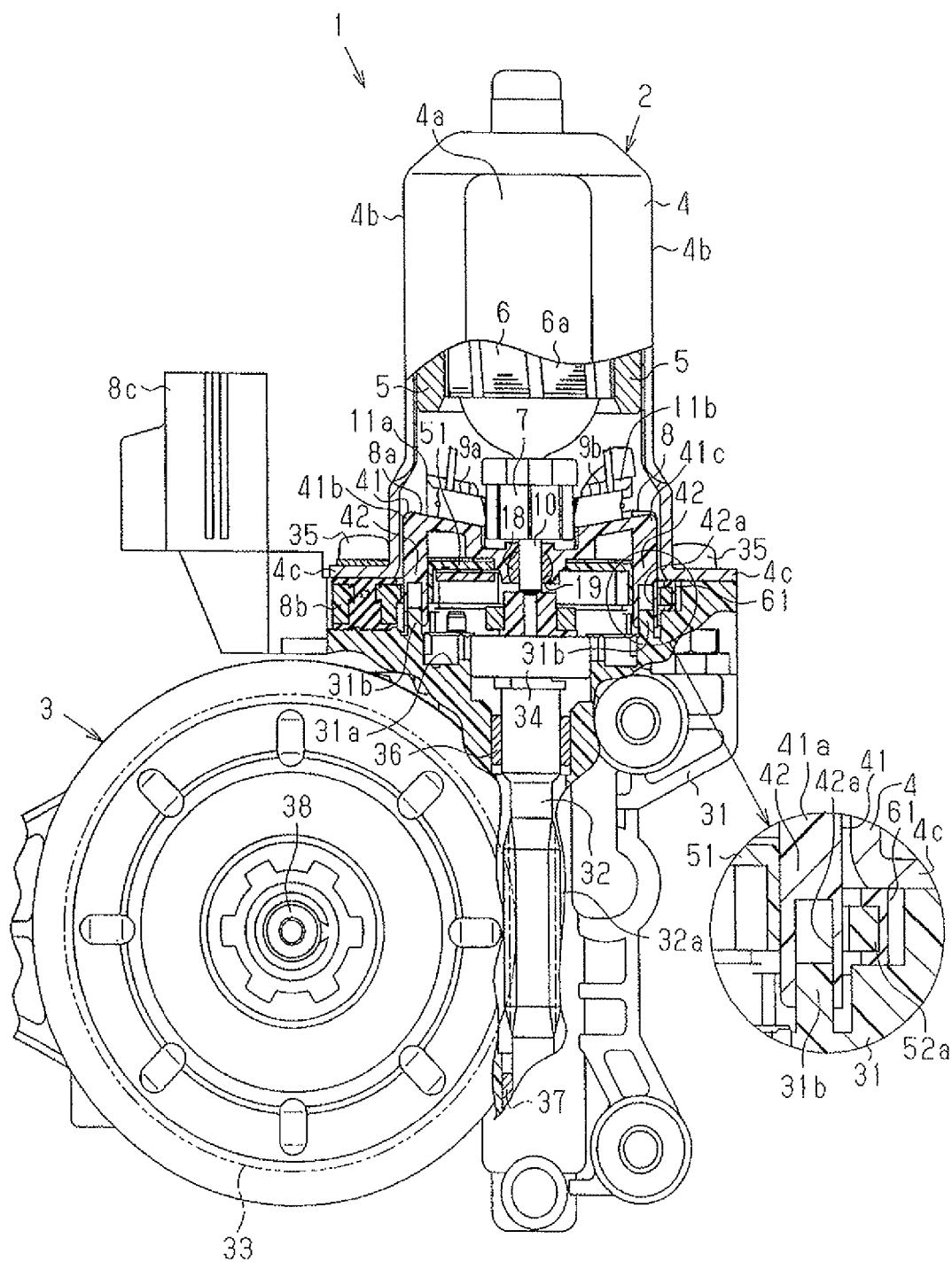
FIG. 1 is a longitudinal cross-sectional view illustrating a direct-current motor according to a first embodiment of the present invention.

The direct-current motor 1 shown in FIG. 1 is used as a drive source of a power window apparatus mounted on a vehicle. The direct-current motor 1 includes a motor main body 2 and a speed reducing portion 3.

As shown in FIG. 1, the motor main body 2 includes a yoke housing 4, a pair of magnets 5, an armature 6, a commutator 7, a brush holder 8, a first brush 9a, and a second brush 9b.

As shown in FIG. 1, the yoke housing 4 is a flat cylinder with a bottom. The yoke housing 4 includes a pair of parallel walls 4a and a pair of curved walls 4b. The parallel walls 4a extend in left and right direction in FIG. 1. Each of the curved walls 4b is connected to the parallel walls 4a. The pair of magnets 5 are each secured to one of the inner surfaces of the curved walls 4b. The yoke housing 4 rotatably accommodates the armature 6. The armature 6 is located between the pair of magnets 5. The armature 6 includes a rotary shaft 10, an armature coil 6a and the commutator 7.

A first bearing (not shown), which rotatably supports the proximal end of the rotary shaft 10, is provided at the center of the bottom of the yoke housing 4 as shown in FIG. 1. The armature coil 6a and the commutator 7 are secured to the rotary shaft 10 to rotate integrally with the rotary shaft 10. The armature coil 6a faces the magnets 5. The commutator 7 is located at an opening portion of the yoke housing 4. That is, the commutator 7 is located between the armature coil 6a and the distal end of the rotary shaft 10. Hereinafter, the axial direction of the rotary shaft 10 will simply be referred to as an "axial direction" when necessary. Also, the radial direction of the rotary shaft 10 will simply be referred to as a "radial direction" when necessary.

As shown in FIG. 1, the opening of the yoke housing 4 includes a pair of yoke flanges 4c, which extend radially outward from the curved walls 4b. The yoke flanges 4c extend along the parallel walls 4a, that is, in left and right direction in FIG. 1.

As shown in FIG. 1, the brush holder 8 covers the opening portion of the yoke housing 4. The brush holder 8 includes a holder main body 8a, an extended portion 8b, and a connector portion 8c. The holder main body 8a is flat and substantially rectangular, and covers the opening portion of the yoke housing 4. Part of the holder main body 8a is inserted and accommodated in the yoke housing 4. The extended portion 8b extends radially outward from the holder main body 8a. The extended portion 8b extends leftward in FIG. 1 in parallel to the parallel walls 4a so as to overlap the yoke flange 4c on the left hand of FIG. 1 as viewed from the axial direction. The connector portion 8c is located at the distal end of the extended portion 8b.

As shown in FIG. 1, the speed reducing portion 3 includes a gear housing 31, a worm shaft 32, a worm wheel 33, and a clutch 34. The worm shaft 32 and the worm wheel 33 configure a speed reducing mechanism, which reduces rotation speed of the rotary shaft 10 and transmits the rotation to an output shaft 38.

As shown in FIG. 1, the gear housing 31 made of synthetic resin accommodates the worm shaft 32, the worm wheel 33, and the clutch 34. An opening portion 31a of the gear housing 31 faces the opening portion of the yoke housing 4. Screws 35 and nuts (not shown) secure the yoke housing 4 to the gear housing 31 such that the gear housing 31 and the yoke housing 4 sandwich the brush holder 8. The screws 35 extend through the yoke flanges 4c. The nuts are retained by the gear housing 31.

As shown in FIG. 1, the opening portion 31a of the gear housing 31 accommodates a third bearing 36 and the clutch 34. The bottom portion of the gear housing 31 accommodates a fourth bearing 37. The third bearing 36 and the fourth bearing 37 support the worm shaft 32 to be rotatable with respect to the gear housing 31. The clutch 34 selectively connects and disconnects the worm shaft 32 to and from the rotary shaft 10. The clutch 34 transmits rotation of the rotary shaft 10 to the worm shaft 32, but does not transmit rotation of the worm shaft 32 to the rotary shaft 10. The clutch 34 is capable of locking the worm shaft 32. That is, the clutch 34 prevents the rotary shaft 10 from being rotated by transmission of power to the rotary shaft 10 from a power load coupled to the output shaft 38.

As shown in FIG. 1, a worm 32a of the worm shaft 32 meshes with the worm wheel 33. The worm wheel 33 includes the output shaft 38, which extends perpendicular to the worm shaft 32. The output shaft 38 is coupled to, for example, a known wire regulator (not shown), which selectively opens and closes a vehicle window glass (not shown). When the motor main body 2 rotates the rotary shaft 10, the rotation of the rotary shaft 10 is sequentially transmitted through the clutch 34, the worm shaft 32, the worm wheel 33, and the output shaft 38, and actuates the regulator to open or close the window glass.

The brush holder 8 will now be described in detail.

Figure 2:
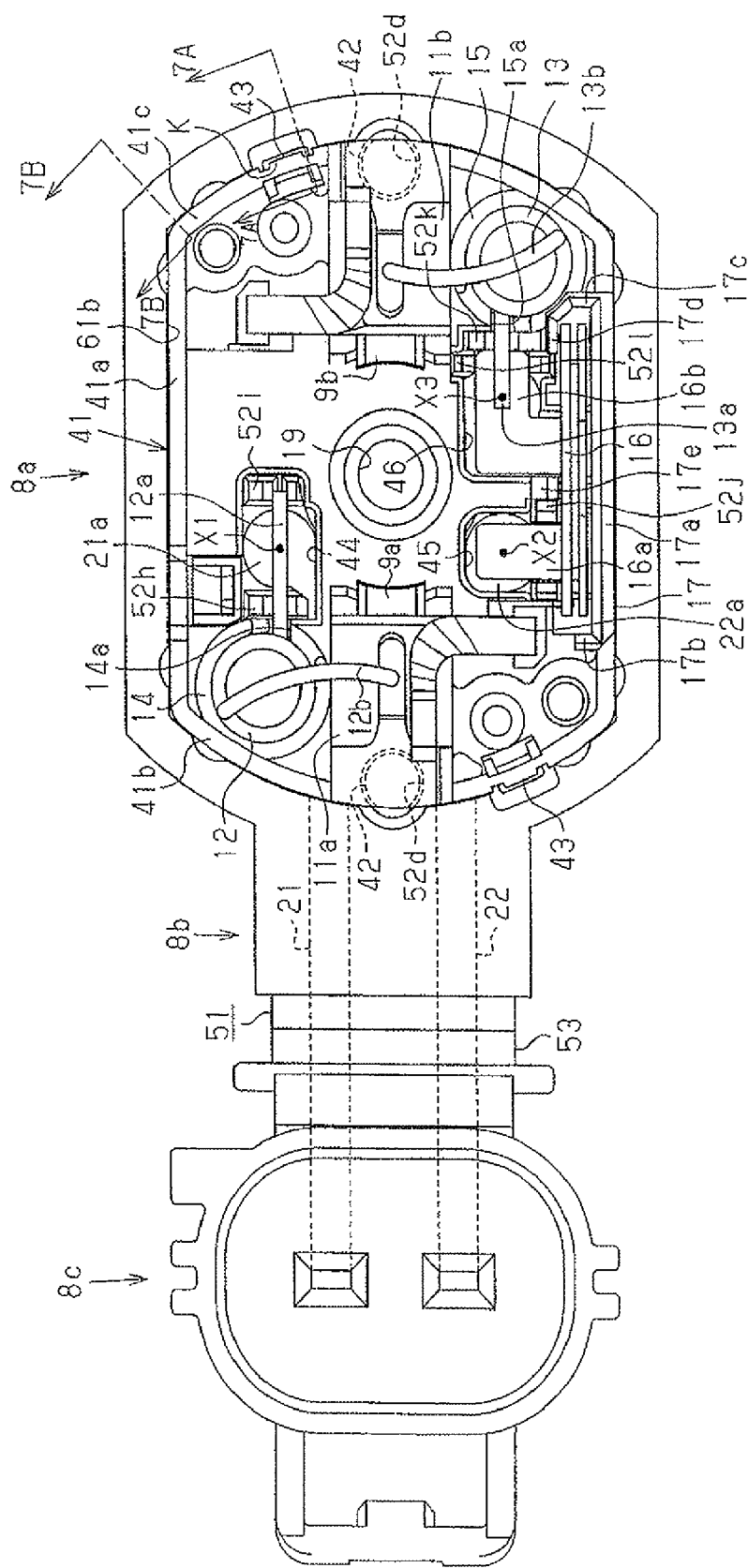
FIG. 2 is a plan view illustrating the brush holder shown in FIG. 1 as viewed from the motor main body.

FIG. 2 shows the brush holder 8 as viewed from the motor main body 2. As shown in FIG. 2, the holder main body 8a includes a first brush retaining portion 11a, a second brush retaining portion 11b, a first coil retaining portion 14, a second coil retaining portion 15, a breaker retaining portion 17, and a bearing retaining portion 19. The connector portion 8c, the extended portion 8b, the first brush retaining portion liar the rotary shaft 10, and the second brush retaining portion 11b are aligned along a straight line extending from left to right in FIG. 2. That is, the first brush retaining portion 11a and the second brush retaining portion 11b are arranged so that the rotary shaft 10 is located in between. The left part of FIG. 2 corresponds to the left part of FIG. 1, and the right part of FIG. 2 corresponds to the right part of FIG. 1.

As shown in FIG. 2, the first brush retaining portion 11a retains the first brush 9a, and the second brush retaining portion 11b retains the second brush 9b. The first coil retaining portion 14 is a component retaining portion that retains an electrical component, which is a first choke coil 12 in the first embodiment. The second coil retaining portion 15 retains a second choke coil 13. The first choke coil 12 and the second choke coil 13 suppress electrical noise that can be generated as the first brush 9a and the second brush 9b slide against the commutator 7. The breaker retaining portion 17 is a component retaining portion, which retains an electrical component, which is a circuit breaker 16 in the first embodiment. The bearing retaining portion 19 retains a second bearing 18 shown in FIG. 1. The second bearing 18 supports the distal end of the rotary shaft 10 to be rotatable with respect to the brush holder 8.

As shown in FIG. 2, a first conductive member 21 and a second conductive member 22 extend through the holder main body 8a and the extended portion 8b to the connector portion 8c. The first conductive member 21 and the second conductive member 22 are referred to as terminal boards, or simply as terminals, when necessary.

As shown in FIG. 2, the first conductive member 21 is electrically connected to the first choke coil 12, and the first choke coil 12 is electrically connected to the first brush 9a. The second conductive member 22 is electrically connected to the circuit breaker 16, the circuit breaker 16 is electrically connected to the second choke coil 13, and the second choke coil 13 is electrically connected to the second brush 9b. That is, since the circuit breaker 16 is electrically connected to the second brush 9b via the second choke coil 13, the circuit breaker 16 is an electrical component indirectly connected to the second brush 9b.

When, for examples a vehicle connector (not shown), which extends from the vehicle, is fitted to the connector portion 8c, the first conductive member 21 and the second conductive member 22 are electrically connected to terminals of the vehicle connector. As a result, a vehicle-mounted battery supplies electricity to the first brush 9a via the first conductive member 21 and the first choke coil 12. Likewise, the battery supplies electricity to the second brush 9b via the second conductive member 22, the circuit breaker 16, and the second choke coil 13.

As shown in FIG. 2, the first conductive member 21 includes a circular connecting terminal, which is a first conductive terminal 21a in the first embodiment, located in the holder main body 8a. Likewise, the second conductive member 22 includes a circular connecting terminal, which is a second conductive terminal 22a in the first embodiment, located in the holder main body 8a.

As shown in FIG. 1, the brush holder 8 includes a retaining member 41, a base member 51, and a sealing member 61. The yoke housing 4, the retaining member 41, the base member 51, and the gear housing 31 are arranged along the axial direction in this order. The retaining member 41 is mounted on the base member 51. The sealing member 61 seals a gap between any two of the yoke housing 4, the base member 51., and the gear housing 31. The retaining member 41 and the base member 51 are made of synthetic resin, and the sealing member 61 is made of an elastic material such as elastomer.

The retaining member 41 will now be described in detail.

Figure 4:
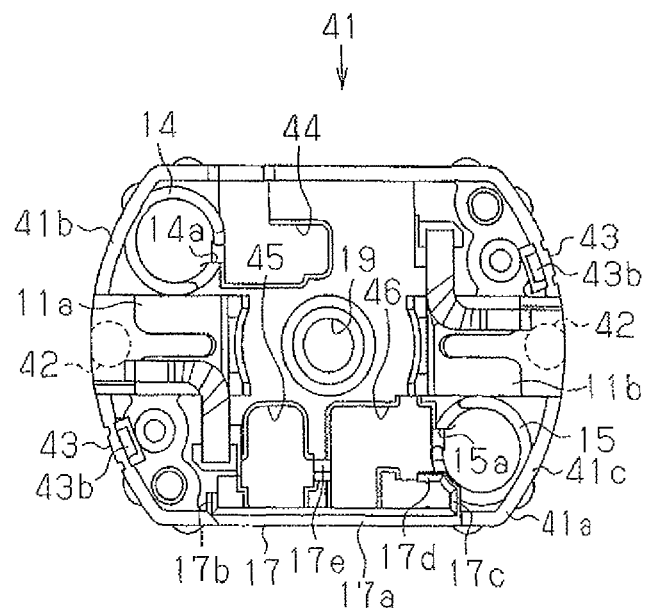
FIG. 4 is a plan view illustrating only the retaining member shown in FIG. 2.
Figure 6:
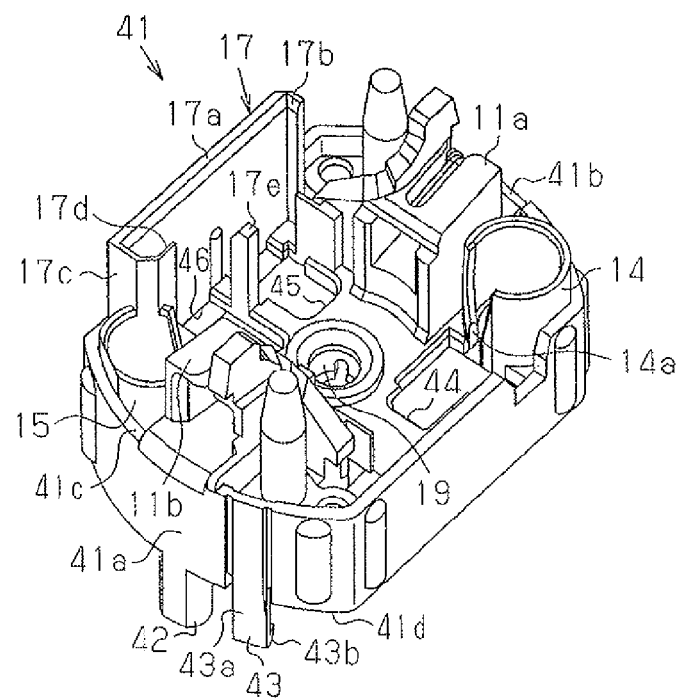
FIG. 6 is a perspective view illustrating the retaining member shown in FIG. 4.

FIG. 4 is a diagram illustrating the retaining member 41 as viewed from the yoke housing 4, and FIG. 6 is a perspective view of the retaining member 41. As shown in FIGS. 4 and 6, the retaining member 41 covers the opening portion of the yoke housing 4. The retaining member 41 is flat, and has a rectangular shape with short sides bulging outward as viewed from the axial direction. That is, the retaining member 41 is substantially circular. The left and right direction of FIG. 4 represents the longitudinal direction of the retaining member 41, and the vertical direction of FIG. 4 represents the width direction of the retaining member 41.

As shown in FIG. 2, the retaining member 41 includes an outer circumferential wall 41a, which surrounds the circumference. The outer circumferential wall 41a extends to project from both ends of the retaining member 41 in the axial direction. As shown in FIG. 7E, the axial end of the outer circumferential wall 41a facing the base member 51 is referred to as an outer edge 41d of the retaining member 41.

As shown in FIG. 2, as viewed from the axial directions the bearing retaining portion 19 is provided at the center portion of the retaining member 41. The bearing retaining portion 19 is a cylinder and extends through the retaining member 41, and the inner circumferential surface of the bearing retaining portion 19 retains the second bearing 18 shown in FIG. 1. The retaining member 41 includes a first longitudinal end 41b and a second longitudinal end 41c. The connector portion 8c, the extended portion 8b, the first longitudinal end 41b, and the second longitudinal end 41c are aligned along a straight line in this order. The first longitudinal end 41b is adjacent to the extended portion 8b. The first longitudinal end 41b and the second longitudinal end 41c are located such that the bearing retaining portion 19 is located in between.

As shown in FIG. 1, the retaining member 41 is fitted and accommodated in the yoke housing 4. As shown in FIGS. 2, 4, and 6, the retaining member 41 includes the first brush retaining portion 11a, the second brush retaining portion 11b, the first coil retaining portion 14, the second coil retaining portion 15, the breaker retaining portion 17, and a pair of positioning poles 42. As shown in FIGS. 2 and 6, the first brush retaining portion 11a, the second brush retaining portion 11b, the first coil retaining portion 14, the second coil retaining portion 15, and the breaker retaining portion 17 are located on the surface of the retaining member 41 facing the yoke housing 4. The positioning poles 42 and engaging pawls 43 extend toward the gear housing 31 from the retaining member 41. That is, the positioning poles 42 and the engaging pawls 43 extend downward in FIG. 1, and toward the back of FIG. 4.

As shown in FIGS. 2 and 4, the first brush retaining portion 11a is located at the center of the first longitudinal end 41b, and the second brush retaining portion 11b is located at the center of the second longitudinal end 41c. The first brush retaining portion 11a and the second brush retaining portion 11b are substantially rectangular tubes extending in the radial direction. The first brush retaining portion 11a retains the substantially rectangular prism-like first brush 9a inserted from a radially outward direction. The second brush retaining portion 11b retains the substantially square prism-like second brush 9b inserted from a radially outward direction.

As shown in FIGS. 2 and 4, the first coil retaining portion 14 is located at the first longitudinal end 41b adjacent to the first brush retaining portion 11a. The second coil retaining portion 15 is located at the second longitudinal end 41c adjacent to the second brush retaining portion 11b. The first coil retaining portion 14 and the second coil retaining portion 15 are located at diagonally opposite corners of the retaining member 41 as viewed from the axial direction. In FIG. 2, the first coil retaining portion 14 is located in the clockwise direction around the rotary shaft 10 with respect to the first brush retaining portion 11a. The second coil retaining portion 15 is located in the clockwise direction around the rotary shaft 10 with respect to the second brush retaining portion 11b. The first coil retaining portion 14 and the second coil retaining portion 15 are arranged such that the bearing retaining portion 19 is located in between.

As shown in FIG. 6, the first coil retaining portion 14 and the second coil retaining portion 15 are substantially cylindrical and extend in the axial direction. The first coil retaining portion 14 and the second coil retaining portion 15 retain the first choke coil 12 and the second choke coil 13, respectively. The first choke coil 12 and the second choke coil 13 are inserted in the axial direction. FIGS. 2 and 8 show the first choke coil 12 and the second choke coil 13, which are cylindrical.

As shown at the center portion of FIG. 2, the first choke coil 12 includes connecting terminals. The connecting terminal electrically connected to the first conductive member 21 is a first coil terminal 12a in the first embodiment, and the connecting terminal electrically connected to the first brush 9a is a first brush terminal 12b in the first embodiment. As shown in the right part of FIG. 2, the second choke coil 13 includes connecting terminals. The connecting terminal electrically connected to the circuit breaker 16 is a second coil terminal 13a in the first embodiment, and the connecting terminal electrically connected to the second brush 9b is a second brush terminal 13b in the first embodiment. Since the first coil terminal 12a is the connecting terminal of the first choke coil 12, which is an electrical component, the first coil terminal 12a can be referred to as a component terminal.

As shown in FIGS. 2 and 8, a first leading slit 14a, which extends in the axial direction, is notched in the circumferential wall, of the first coil retaining portion 14. As shown in FIG. 2, a second leading slit 15a, which extends in the axial direction, is notched in the circumferential wall of the second coil retaining portion 15. The first leading slit 14a is located at part of the first coil retaining portion 14 facing the bearing retaining portion 19. The second leading slit 15a is located at part of the second coil retaining portion 15 facing the bearing retaining portion 19.

As shown in FIGS. 2 and 8, the first leading slit 14a permits the first coil terminal 12a to be lead out from the inside of the first coil retaining portion 14. As shown in FIG. 2, the second leading slit 15a permits the second coil terminal 13a to be lead out from the inside of the second coil retaining portion 15. That is, the first coil terminal 12a and the second coil terminal 13a extend in a direction perpendicular to the axial direction. The first coil terminal 12a and the second coil terminal 13a are arranged to extend in the longitudinal direction of the retaining member 41. The slit width of the first leading slit 14a is slightly greater than the diameter of the first coil terminal 12a. The slit width of the second leading slit 15a is slightly greater than the diameter of the second coil terminal 13a.

As shown in FIG. 2, the first brush terminal 12b is electrically connected to the first brush 9a in a state where the first brush terminal 12b is pulled out of the cylinder of the first coil retaining portion 14 in the axial direction toward the yoke housing 4. The second brush terminal 13b is electrically connected to the second brush 9b in a state where the second brush terminal 13b is pulled out of the cylinder of the second coil retaining portion 15 in the axial direction. That is, the first brush terminal 12b does not extend through the first leading slit 14a, and the second brush terminal 13b does not extend through the second leading slit 15a.

Figure 9:
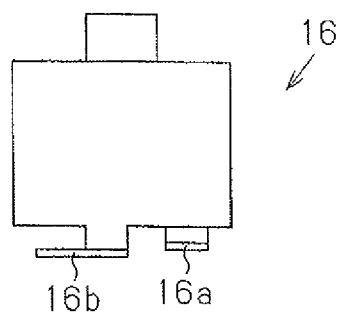
FIG. 9 is a front view illustrating only the circuit breaker shown in FIG. 2.

As shown in FIG. 2, the breaker retaining portion 17 is adjacent to the second coil retaining portion 15 as viewed from the axial direction. The breaker retaining portion 17 is adjacent to the outer circumferential wall 41a of the retaining member 41, and extends along the longitudinal direction of the retaining member 41. The breaker retaining portion 17 is a channel that extends in the axial direction, and opens toward the bearing retaining portion 19. The breaker retaining portion 17 is capable of retaining the substantially plate-like circuit breaker 16 that is inserted from the axial direction. FIG. 9 shows the entire circuit breaker 16.

As shown in FIGS. 2 and 4, the breaker retaining portion 17 includes a support wall 17a, a first side wall 17b, a second side wall 17c, an extended opposing wall 17d, and a center facing pole 17e, which configure a channel shape. The support wall 17a extends in the longitudinal direction of the retaining member 41 to overlap the outer circumferential wall 41a of the retaining member 41 as viewed from the axial direction. The support wall 17a extends also in the axial direction. The first side wall 17b extends from the end of the support wall 17a that is adjacent to the first longitudinal end 41b to bend toward the bearing retaining portion 19. The second side wall 17c extends from the end of the support wall 17a that is adjacent to the second coil retaining portion 15 to bend toward the bearing retaining portion 19. The extended opposing wall 17d extends from the second side wall 17c along the support wall 17a. The center facing pole 17e is located to face the center portion of the support wall 17a and extends in the axial, direction.

As shown in FIG. 2, the plate-like circuit breaker 16 includes connecting terminals, which are a first breaker terminal 16a and a second breaker terminal 16b in the first embodiment. The first breaker terminal 16a is adjacent to the first longitudinal end 41b, and the second breaker terminal 16b is adjacent to the second coil retaining portion 15. The first breaker terminal 16a is a plate that projects in the thickness direction of the circuit breaker 16, and the second breaker terminal 16b is a plate that projects in the thickness direction and then bends toward the second coil retaining portion 15. The first breaker terminal 16a extends between the center facing pole 17e and the first side wall 17b, and is lead out from the inside of the breaker retaining portion 17. The second breaker terminal 16b extends between the center facing pole 17e and the second side wall 17c, and is lead out from the inside of the breaker retaining portion 17. Since the first breaker terminal 16a is the connecting terminal of an electrical component, which is the circuit breaker 16 in the first embodiment, the first breaker terminal 16a can be referred to as a component terminal.

As shown in FIG. 9, the second breaker terminal 16b slightly projects in the axial direction than the first breaker terminal 16a. The vertical direction of FIG. 9 represents the axial direction of the rotary shaft 10.

As shown in FIG. 2, a connecting portion between the first conductive terminal 21a and the first coil terminal 12a is referred to as a first connecting portion X1. A connecting portion between the second conductive terminal 22a and the first breaker terminal 16a is referred to as a second connecting portion X2. A connecting portion between the second breaker terminal 16b and the second coil terminal 13a is referred to as a third connecting portion X3.

FIGS. 2 and 8 show a state before the first coil terminal 12a is welded to the first conductive terminal 21a. That is, in FIGS. 2 and 8, the first coil terminal 12a and the first conductive terminal 21a are both before being melted, and are simply placed one on the other in the axial direction. Likewise, FIG. 2 shows a state before the first breaker terminal 26a is welded to the second conductive terminal 22a, and a state before the second coil terminal 13a is welded to the second breaker terminal 16b.

Figure 10:
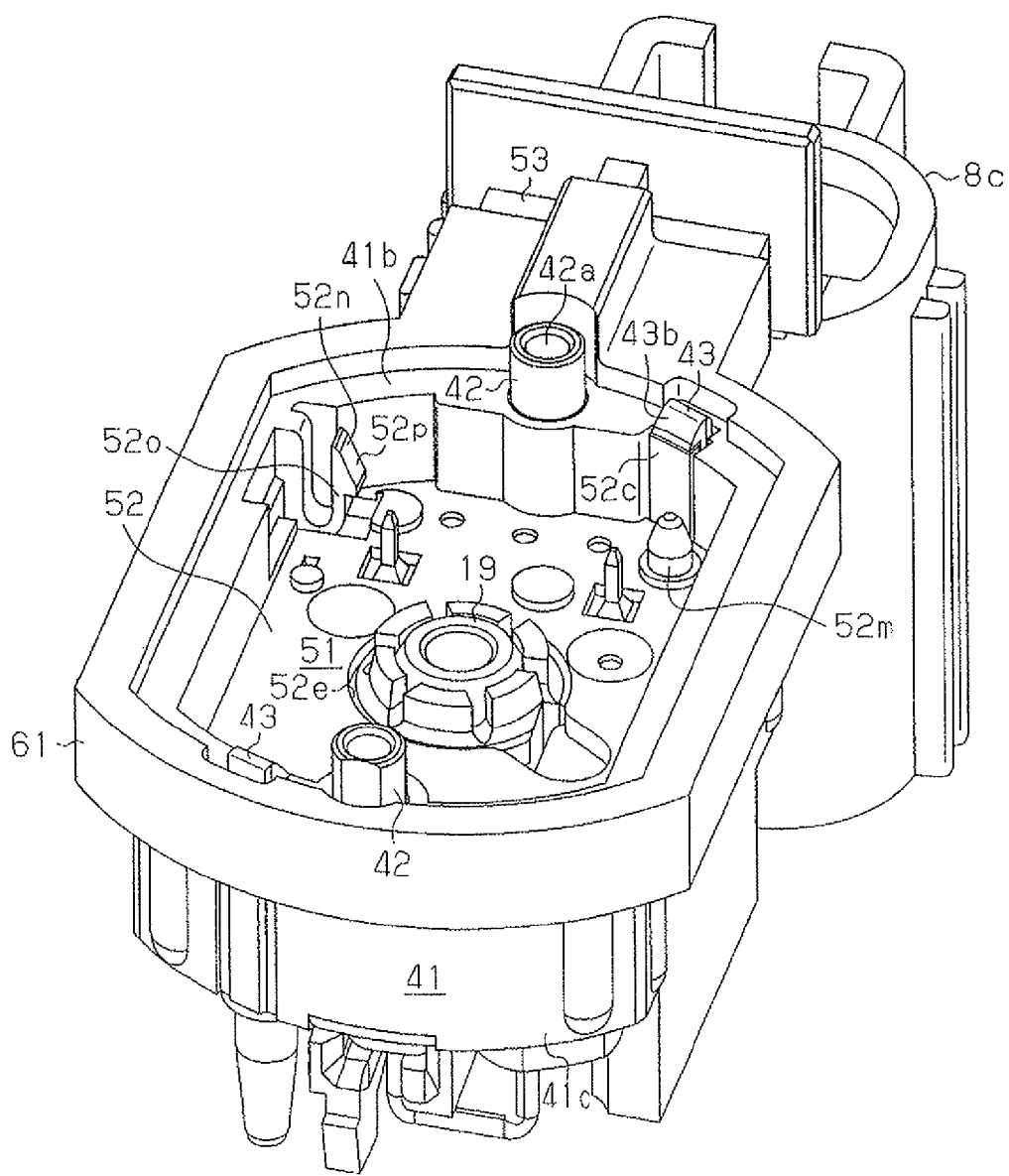
FIG. 10 is a bottom perspective view illustrating the brush holder of FIG. 1 as viewed from the speed reducing mechanism.

As shown in FIG. 2, the positioning poles 42 are located at the center of the first longitudinal end 41b and the second longitudinal end 41c, respectively, as viewed from the axial direction. The positioning poles 42 extend in the axial direction toward the gear housing 31b. As shown in FIGS. 1 and 10, a circular hole-like fitting recess 42a, which extend in the axial direction, is formed in the distal end of each positioning pole 42.

As shown in FIG. 1, the gear housing 31 includes a pair of positioning projections 31b. The positioning projections 31b extend in the axial direction toward the yoke housing 4. When the positioning projections 31b are fitted in the fitting recesses 42a, the position of the retaining member 41 is determined with respect to the gear housing 31. The position of the retaining member 41 is determined with respect to the gear housing 31 such that the retaining member 41 is prevented from moving in a direction perpendicular to the axial direction. The positioning poles 42 function as positioning portions of the retaining member 41. The positioning projections 31b function as positioning portions of the gear housing 31.

As shown in FIGS. 2 and 4, the total of two engaging pawls 43 are located at the first longitudinal end 41b and the second longitudinal end 41c, respectively. As viewed from the axial direction, the engaging pawl 43 of the first longitudinal end 41b and the first coil retaining portion 14 are arranged such that the first brush retaining portion 11a is located in between. Likewise, as viewed from the axial direction, the engaging pawl 43 of the second longitudinal end 41c and the second coil retaining portion 15 are arranged such that the second brush retaining portion 11b is located in between.

As shown in FIGS. 6 and 7A, the engaging pawls 43 extend in the axial direction toward the yoke housing 4, and extend along the outer circumferential wall 41a of the retaining member 41. The engaging pawls 43 are snap fits so as to facilitate mounting to the base member 51. That is, each engaging pawl 43 includes an elastic portion 43a, which extends in the axial direction, and a pawl portion 43b, which is located at the distal end of the elastic portion 43a. The pawl portions 43b project toward the bearing retaining portion 19. Since the elastic portions 43a are long plates that extend perpendicular to the radial direction of the rotary shaft 10, the elastic portions 43a easily flex in a direction to approach and separate from the base member 51, and do not easily flex in the circumferential direction of the base member 51.

As shown in FIGS. 2 and 6, the retaining member 41 includes a first through window 44, a second through window 45, and a third through window 46. The first through window 44 to the third through window 46 extend through the retaining member 41 in the axial direction.

As shown in FIGS. 2 and 8, the first through window 44 is adjacent to the first leading slit 14a of the first coil retaining portion 14. The first through window 44 is located to overlap the first coil terminal 12a, which projects from the first leading slit 14a, as viewed from the axial direction.

As shown in FIGS. 2 and 6, the second through window 45 is located between the center facing pole 17e and the first side wall 17b. The second through window 45 is located to overlap the first breaker terminal 16a as viewed from the axial direction.

As shown in FIGS. 2 and 6, the third through window 46 is adjacent to the second leading slit 15a of the second coil retaining portion 15. The third through window 46 is located to overlap the second coil terminal 13a, which projects from the second leading slit 15a, and the second breaker terminal 16b as viewed from the axial direction.

The base member 51 will now be described in detail.

Figure 3:
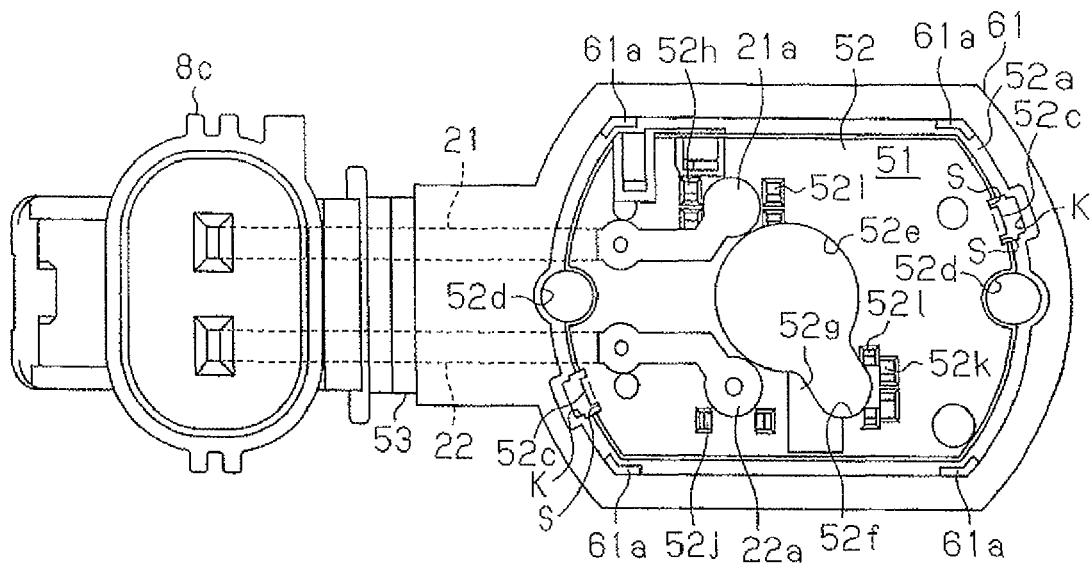
FIG. 3 is a plan view illustrating the base member and the sealing member with the retaining member removed from FIG. 2.
Figure 5:
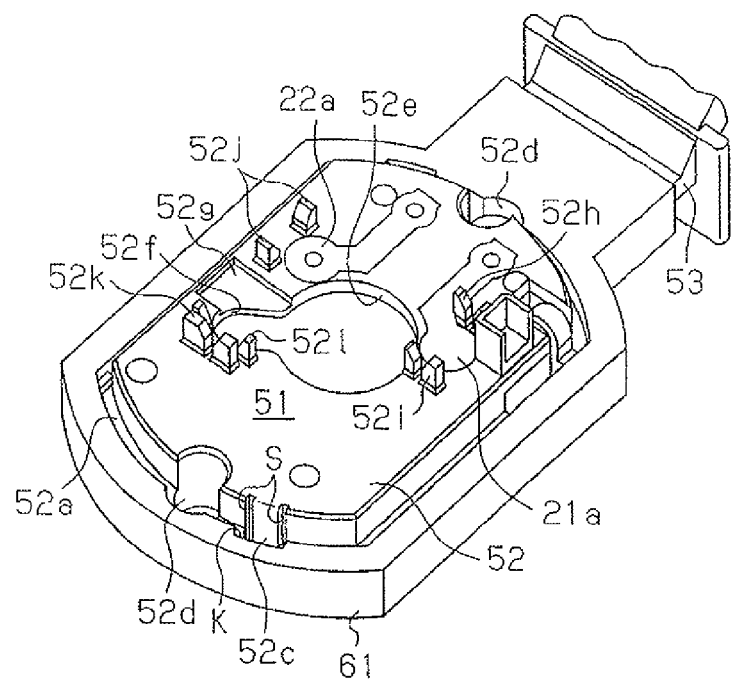
FIG. 5 is a perspective view illustrating the base portion and the sealing member shown in FIG. 3.

FIG. 3 shows a state where the retaining member 41 is detached from the brush holder 8 of FIG. 2, and FIG. 5 shows a perspective view of the base member 51. As shown in FIGS. 3 and 5, the base member 51 includes a base portion 52, a base extended portion 53, and the connector portion 8c. The base portion 52 is slightly greater than the retaining member 41 as viewed from the axial direction. That is, the base portion 52 is flat and has a substantially rectangular shape with curved short sides. The retaining member 41 is mounted on the base portion 52 from the axial direction. The retaining member 41 and the base portion 52 configure the holder main body 8a. The base extended portion 53 configures the extended portion 8b, and the connector portion 8c is located at the distal end of the base extended portion 53.

As shown in FIGS. 2 and 3, the first conductive member 21 and the second conductive member 22 are elongated, and are embedded inside the connector portion 8c, the base extended portion 53, and the base portion 52 by insert molding. The first conductive terminal 21a and the second conductive terminal 22a are both located at the base portion 52. The first conductive terminal 21a and the second conductive terminal 22a are exposed on the axial ends of the base portion 52.

The first conductive terminal 21a is welded to the first coil terminal 12a at the first connecting portion X1. The second conductive terminal 22a is welded to the first breaker terminal 16a at the second connecting portion X2. The second breaker terminal 16b is welded to the second coil terminal 13a at the third connecting portion X3. In the first embodiment, the first connecting portion X1 to the third connecting portion X3 are spot welded by a pair of welding jigs inserted from the axial direction.

Figure 11:
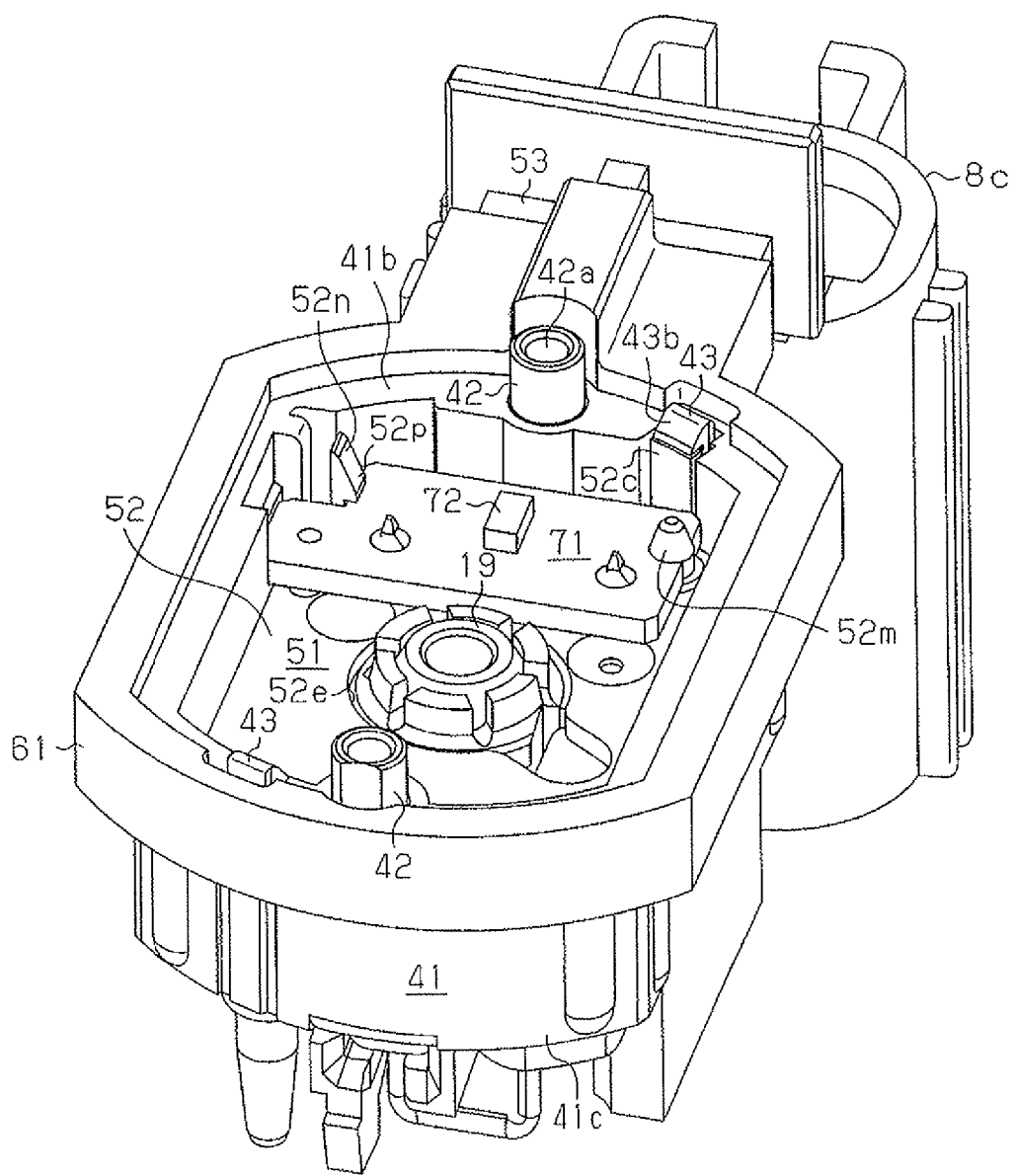
FIG. 11 is a bottom perspective view illustrating a state where the circuit board is mounted on the brush holder of FIG. 10.

As shown in FIG. 3, the base portion 52 includes a base flange 52a, a pair of engaging wall portions 52c, a pair of insertion bores 52d, a center bore 52e, a welding bore 52f, an accommodating recess 52g, a first coil terminal support portion 52h, an auxiliary support portion 52i, a first breaker terminal support portion 52j, a second coil terminal support portion 52k, and a second breaker terminal support portion 52l. Furthermore, as shown in FIGS. 10 and 11, the base portion 52 includes a positioning protrusion 52m and a retaining hook 52n. The positioning protrusion 52m and the retaining hook 52n are located on the surface of the base portion 52 facing the gear housing 31.

As shown in FIG. 7B, the base portion 52 is a box that is open toward the gear housing 31, and the base flange 52a is located at the end portion of the side wall of the base portion 52 closer to the gear housing 31. The engaging wall portions 52c and the insertion bores 52d are located on the base flange 52a closer to the inner part of the base portion 52. As shown in FIG. 3, the center bore 52e is located at the center of the base portion 52, and the welding bore 52f extends radially from the center bore 52e. The accommodating recess 52g, the first coil terminal support portion 52h, the auxiliary support portion 52i, the first breaker terminal support portion 52j, the second coil terminal support portion 52k, and the second breaker terminal support portion 52l are located on the surface of the base portion 52 facing the retaining member 41.

As shown in FIG. 7O, the base portion 52 is accommodated inside the outer edge 41d of the retaining member 41. The base flange 52a passes below the outer edge 41d of the retaining member 41 and extends outside from the inside of the retaining member 41. When the engaging pawls 43 engage with the engaging wall portions 52c, the outer edge 41d of the retaining member 41 is loosely fitted to the step between the base flange 52a and the side wall of the base portion 52. As viewed from the axial direction, the outer edge 41d of the retaining member 41 overlaps the base flange 52a.

The sealing member 61 will now be described in detail.

As shown in FIG. 3, the sealing member 61 covers the base flange 52a, and is a substantially rectangular frame that surrounds the base member 51. The sealing member 61 covers the proximal end of the base extended portion 53. As shown in FIGS. 7A and 7B, the sealing member 61 is located radially outward of the outer edge 41d of the retaining member 41. The sealing member 61 is integrated with the base member 51. The base member 51 is, for example, an insert piece to integrate the sealing member 61 with the base member 51. As shown in FIG. 1, in a state where the yoke housing 4 and the gear housing 31 sandwich the brush holder 8, the yoke housing 4 and the gear housing 31 sandwich the sealing member 61.

As shown in FIGS. 3 and 5, the sealing member 61 includes four sandwiched parts 61a. The sandwiched parts 61a are located at four corners of the substantially rectangular base flange 52a as viewed from the axial direction. As shown in FIG. 7B, the sandwiched parts 61a are elastic members, which are sandwiched by the base flange 52a and the outer edge 41d of the retaining member 41 from the axial direction. That is, the outer circumferential wall 41a of the retaining member 41 and the base flange 52a sandwich the sandwiched parts 61a. The sandwiched parts 61a are integrally molded with the sealing member 61.

As shown in FIG. 7B, the sealing member 61 includes an end surface extending in the axial direction, which is an inner edge 61b in the first embodiment. The inner edge 61b of the sealing member 61 is in surface contact with the outer edge 41d of the retaining member 41. As shown in FIGS. 2 and 7A, when the retaining member 41 is mounted on the base member 51, the inner edge 61b of the seating member 61 serves as an elastic engaging portion, which engages with the outer circumferential wall 41a of the retaining member 41. That is, the inner edge 61b of the sealing member 61 prevents the retaining member 41 from moving in a direction perpendicular to the axial direction. Since the compression direction of the sandwiched parts 61a is the axial direction, the inner edge 61b of the sealing member 61 prevents the retaining member 41 from moving in a direction perpendicular to the compression direction of the sandwiched parts 61a.

The sandwiched parts 61a project radially inward from the inner edge 61b of the sealing member 61. The axial dimension of the sandwiched parts 61a is less than the axial dimension of the inner edge 61b of the sealing member 61. The outer edge 41d of the retaining member 41 is fitted to the step between the sandwiched parts 61a and the inner edge 61b of the sealing member 61.

The base member 51 is described in detail.

As shown in FIGS. 3 and 5, the pair of engaging wall portions 52c are engaging pieces each of which elastically deforms to engage with the corresponding one of the engaging pawls 43. When the engaging pawls 43 are engaged with the engaging wall portions 52c, the retaining member 41 is mounted on the base portion 52.

As shown in FIGS. 3 and 7A, the base portion 52 includes a pair of engaging bores K, which accommodate the engaging wall portions 52c. That is, the engaging bores K are located radially inward of the base flange 52a, and the engaging wall portions 52c configure part of the side wall of the engaging bores K. The engaging wall portions 52c are long plates that extend toward the gear housing 31 in the axial direction. The engaging wall portions 52c are formed to elastically deform such that the engaging pawls 43 of the retaining member 41 easily engage with the engaging wall portions 52c.

As shown in FIG. 7A, each engaging wall portion 52c includes an engaging surface 52b, which engages with the pawl portion 43b of the corresponding engaging pawl 43. The engaging surface 52b is an axial end surface of the engaging wall portion 52c facing the gear housing 31. The engaging surface 52b is inclined with respect to the surface perpendicular to the axial direction. That is, the engaging surface 52b is inclined with respect to the left and right direction of FIG. 7A, and is inclined upward toward the inside of the base portion 52. The angle between the engaging surface 52b and the outer surface of the engaging wall portion 52c is an acute angle. In other words, the angle between the surface of the engaging wall portion 52c, which faces the elastic portion 43a, and the engaging surface 52b is an acute angle. Thus, in a state where each pawl portion 43b is engaged with the corresponding engaging surface 52b, the pawl portion 43b is prevented from being unintentionally disengaged from the engaging wall portion 52c by vibration.

As shown in FIGS. 3 and 5, each engaging wall portion 52c is partitioned from the outer circumferential surface of the base member 51 by a pair of slits S, which extend in the axial direction. As shown in FIG. 7A, the axial dimension of the engaging wall portions 52c is equal to the axial dimension of the side wall of the base portion 52, and is greater than the axial dimension of the base flange 52a. That is, the engaging wall portions 52c are connected to the base member 51 at portions closer to the yoke housing 4 than the base flange 52a. The axial position of the engaging surfaces 52b is the same as the axial position of the axial end surface of the base flange 52a, which faces the gear housing 31. Like the elastic portions 43a, since the engaging wall portions 52c are long plates that extend perpendicular to the radial direction of the rotary shaft 10, the engaging wall portions 52c easily flex in a direction to approach and separate from the base member 51, and does not easily flex in the circumferential direction of the base member 51.

As shown in FIG. 7A, the radial dimension W1 of the engaging bores K is set smaller than the radial dimension W2 of the pawl portions 43b (W1<W2). The radial dimension W2 represents the dimension of the pawl portions 43b in the flexing direction. That is, each engaging pawl 43 enters the corresponding engaging bore K while flexing the associated engaging wall portion 52c, and the pawl portion 43b that has passed the engaging bore K engages with the associated engaging surface 52b. The radial dimension W1 of the engaging bores K represents the distance between each engaging wall portion 52c and the base flange 52a in a state where the engaging wall portion 52c is not elastically deformed. As described above, since the engaging pawls 43 do not easily come out of the engaging bores K, the retaining member 41 is prevented from being unintentionally disengaged from the base member 51.

As shown in FIG. 7A, when mounting the retaining member 41 on the base member 51, the engaging pawls 43 are inserted in the engaging bores K in the axial direction. Each pawl portion 43b passes through the corresponding engaging bore K, and engages with the associated engaging surface 52b. The axial dimension of the elastic portions 43a of the engaging pawls 43 is set such that a gap is provided between the retaining member 41 and the base member 51 in a state where the pawl portions 43b are engaged with the engaging surfaces 52b. That is, the retaining member 41 is loosely fit in the base member 51. More specifically, in a state where the pawl portions 43b are engaged with the engaging surfaces 52b, the outer edge 41d of the retaining member 41 does not directly contact the base flange 52a from the axial direction as shown in FIG. 7B. As shown in FIG. 7B, since the retaining member 41 and the base member 51 sandwich the sandwiched parts 61a in a compressed state, the retaining member 41 is mounted on the base member 51 without backlash.

As shown in FIG. 2, the diameter of the pair of insertion bores 52d is greater than that of the positioning poles 42. In a state where the retaining member 41 is mounted on the base member 51, the positioning poles 42 extend through the insertion bores 52d.

As shown in FIGS. 3 and 5, the diameter of the center bore 52e is greater than that of the bearing retaining portion 19. In a state where the retaining member 41 is mounted on the base member 51, the bearing retaining portion 19 extends through the center bore 52e.

As shown in FIGS. 3 and 5, the welding bore 52f extends radially outward from the center bore 52e. The welding bore 52f is located to correspond to the third connecting portion X3. That is, the welding bore 52f overlaps the second coil terminal 13a and the second breaker terminal 16b as viewed from the axial direction.

As shown in FIGS. 3 and 5, the accommodating recess 52g is adjacent to both of the center bore 52e and the welding bore 52f. The accommodating recess 52g accommodates the second breaker terminal 16b. The accommodating recess 52g is recessed by an amount corresponding to the projecting amount of the second breaker terminal 16b and the first breaker terminal 16a in the axial direction with respect to the first conductive terminal 21a and the second conductive terminal 22a. Thus, the axial position of the third connecting portion X3 is made the same as the axial position of the first connecting portion X1 and the second connecting portion X2. As a result, when spot welding the first connecting portion X1 to the third connecting portion X3, the axial position of the welding jigs is easily determined.

As shown in FIGS. 2 and 8, the first coil terminal support portion 52h supports the first coil terminal 12a in a state where the retaining member 41 is mounted on the base member 51. The first coil terminal support portion 52h includes a pair of sandwiching pieces that sandwich the first coil terminal 12a between the first connecting portion X1 and the first coil retaining portion 14. The first coil terminal support portion 52h extends in the axial direction through the first through window 44. The distance between the sandwiching pieces of the first coil terminal support portion 52h is substantially the same as the diameter of the first coil terminal 12a, and the first coil terminal support portion 52h is capable of sandwiching the first coil terminal 12a to be immovable.

As shown in FIGS. 2 and 8, the auxiliary support portion 52i retains the first coil terminal 12a in a state where the retaining member 41 is mounted on the base member 51. The auxiliary support portion 52i includes a pair of sandwiching pieces that sandwich the distal end of the first coil terminal 12a. The auxiliary support portion 52i and the first coil terminal support portion 52h are arranged such that the first connecting portion X1 is located in between. The auxiliary support portion 52i extends in the axial direction through the first through window 44. The distance between the sandwiching pieces of the auxiliary support portion 52i is substantially the same as the diameter of the first coil terminal 12a, and the auxiliary support portion 52*i* is capable of sandwiching the first coil terminal 12*a* to be immovable.

As shown in FIGS. 2 and 8, the first through window 44 has a size large enough to permit the first coil terminal support portion 52*h* and the auxiliary support portion 52*i* to extend therethrough. As viewed from the axial direction, the first through window 44 has a size that covers the entire length of the first coil terminal 12*a* and the first conductive terminal 21*a*. The first through window 44 functions as a space for permitting radiation of heat during welding of the first connecting portion X1, which facilitates welding. Also, the first through window 44 suppresses transmission of the welding heat to the retaining member 41.

As shown in FIG. 2, the first breaker terminal support portion 52*j* supports the first breaker terminal 16*a* in a state where the retaining member 41 is mounted on the base member 51. The first breaker terminal support portion 52*j* includes a pair of sandwiching pieces that sandwich the first breaker terminal 16*a* between the second connecting portion X2 and the breaker retaining portion 17. The first breaker terminal support portion 52*j* extends in the axial direction through the second through window 45. The distance between the sandwiching pieces of the first breaker terminal support portion 52*j* is substantially the same as the width of the first breaker terminal 16*a*, and the first breaker terminal support portion 52*j* is capable of sandwiching the first breaker terminal 16*a* to be immovable.

As shown in FIG. 2, the second through window 45 has a size large enough to permit the first breaker terminal support portion 52*j* to extend therethrough. The second through window 45 is greater than the entire length of the first breaker terminal 16*a* as viewed from the axial direction, and has a size that covers the second conductive terminal 22*a*. The second through window 45 functions as a space for permitting radiation of heat during welding of the second connecting portion X2, which facilitates welding. Also, the second through window 45 suppresses transmission of the welding heat to the retaining member 41.

As shown in FIG. 2, the second coil terminal support portion 52*k* supports the second coil terminal 13*a* in a state where the retaining member 41 is mounted on the base member 51. The second coil terminal support portion 52*k* includes a pair of sandwiching pieces that sandwich the second coil terminal 13*a* between the third connecting portion X3 and the second coil retaining portion 15. The second coil terminal support portion 52*k* extends in the axial direction through the third through window 46. The distance between the sandwiching pieces of the second coil terminal support portion 52*k* is substantially the same as the diameter of the second coil terminal 13*a*, and the second coil terminal support portion 52*k* is capable of supporting the second coil terminal 13*a* to be immovable.

As shown in FIG. 2, the second breaker terminal support portion 52*l* supports the second breaker terminal 16*b* in a state where the retaining member 41 is mounted on the base member 51. The second breaker terminal support portion 52*l* includes a pair of sandwiching pieces that sandwich the distal end of the second breaker terminal 16*b* between the third connecting portion X3 and the second coil terminal support portion 52*k*. The second breaker terminal support portion 52*l* extends in the axial direction through the third through window 46. The distance between the sandwiching pieces of the second breaker terminal support portion 52*l* is substantially the same as the width of the distal end of the second breaker terminal 16*b*, and the second breaker terminal support portion 52*l* is capable of sandwiching the second breaker terminal 16*b* to be immovable.

The third through window 46 has a size large enough to permit the second coil terminal support portion 52*k* and the second breaker terminal support portion 52*l* to extend therethrough. The third through window 46 is greater than the entire length of the second coil terminal 13*a* and the second breaker terminal 16*b* as viewed from the axial direction. The third through window 46 functions as a space for permitting radiation of heat during welding of the third connecting portion X3, which facilitates welding. Also, the third through window 46 suppresses transmission of welding heat to the retaining member 41.

As shown in FIG. 11, the positioning protrusion 52*m* and the retaining hook 52*n* are capable of retaining a circuit board 71 by sandwiching. The circuit board 71 is electrically connected to both of the first conductive member 21 and the second conductive member 22. A sensor for detecting rotation of the rotary shaft 10, which is a hall IC72 in the first embodiment, is mounted on the circuit board 71. The hall IC72 detects the rotation speed of a sensor magnet, which rotates integrally with the rotary shaft 10.

As shown in FIGS. 10 and 11, the positioning protrusion 52*m* and the retaining hook 52*n* face the gear housing 31, and are located opposite to the first coil terminal support portion 52*h* and the auxiliary support portion 52*i* on the base portion 52. The positioning protrusion 52*m* and the retaining hook 52*n* are located between the center bore 52*e* and the connector portion 8*c*. As shown in FIG. 10, the positioning protrusion 52*m* is like a conical frustum. The retaining hook 52*n* includes an U-shaped curved elastic portion 52*o* and a retaining pawl portion 52*p*, which is located at the distal end of the curved elastic portion 52*o*. As the cured elastic portion 52*o* flexes, the distance between the positioning protrusion 52*m* and the retaining pawl portion 52*p* is adjusted. The retaining pawl portion 52*p* projects toward the positioning protrusion 52*m*.

As shown in FIG. 11, a first end of the circuit board 71 in the longitudinal direction is supported by the positioning protrusion 52*m*, and a second end of the circuit board 71 in the longitudinal direction is engaged with the retaining hook 52*n* so that the circuit board 71 is retained by the base portion 52. The retaining pawl portion 52*p* prevents the circuit board 71 from falling off.

These components are assembled with one another into the direct-current motor 1, which includes the brush holder 8.

The first embodiment has the following advantages.

(1) As shown in FIG. 1, the brush holder 8 includes the retaining member 41 and the base member 51. The remaining member 41 includes the first brush retaining portion 11*a* and the second brush retaining portion 11*b*. The base member 51 includes the connector portion 8*c*. The retaining member 41 is mounted on the base member 51. That is, after molding the retaining member 41 and the base member 51 separately, the retaining member 41 is mounted on the base member 51. Thus, although the distance between the first brush retaining portion 11*a* and the connector portion 8*c* is short, the connector portion 8*c* does not interfere with molding operation of the first brush retaining portion 11*a*. Thus, the size of the brush holder 8 is reduced. That is, the size of the direct-current motor 1 is reduced.

Also, when manufacturing several brush holders 8, in a case where the position of the connector portion 8*c* with respect to the first brush retaining portion 11*a* is different in each brush holder 8, the retaining member 41 of the brush holder 8 may have the common specification. That is, several retaining members 41 can be manufactured with a single mold, and only molds for manufacturing base members 51 need to be prepared. That is, costs of the molds and procedures are reduced.

Also, as shown in FIG. 7A, the retaining member 41 is easily mounted on the base member 51 by engaging the engaging pawls 43 with the engaging wall portions 52c. The pawl portions 43b are engaged with the engaging surfaces 52b. The assembly strength can be increased by increasing the size of the pawl portions 43b.

Also, as shown in FIG. 7A, the engaging wall portions 52c are elastically deformable. That is, when engaging the engaging pawls 43 with the engaging wall portions 52c, both of the engaging pawls 43 and the engaging wall portions 52c flex. Thus, for example, as compared to a case where only the engaging pawls 43 elastically deform and the engaging wall portions 52c do not deform, the first embodiment reduces the diameter of the engaging bores K. That is, a space formed in the base member 51 for elastic deformation of the engaging pawls 43 is reduced. This adds to the flexibility of the design of the base member 51. That is, wasted space is reduced and the size of the brush holder 8 is reduced.

(2) As shown in FIGS. 6 and 7A, the engaging pawls 43 extend in the axial direction along the outer circumferential wall 41a of the retaining member 41. Thus, for example, unlike the case where the engaging pawls 43 are arranged inward of the retaining member 41 than the outer circumferential wall 41a, the first embodiment does not have an adverse effect on the space where the components on the brush holder 8 are arranged. That is, the engaging pawls 43 according to the first embodiment prevent the space for the components on the brush holder 8 to be arranged from being reduced and becoming short, and also prevents the space for arrangement from being changed. Thus, the size of the brush holder 8 is reduced.

(3) As shown in FIG. 3, the engaging bores K, which accommodate the engaging wall portions 52c, are located radially inward of the base flange 52a. The engaging wall portions 52c are elastically deformable in a direction away from the base flange 52a. As shown in FIG. 7A, the radial dimension W1, which represents the distance between the engaging wall portions 52c and the base flange 52a in a state where elastic deformation is not caused, is set smaller than the radial dimension W2 of the pawl portions 43b (W1<W2). When inserting the engaging pawls 43 in the engaging bores K, the pawl portions 43b are inserted in the engaging bores K while elastically deforming the engaging wall portions 52c in a direction away from the base flange 52a, and are engaged with the engaging surfaces 52b.

Thus, even if the pawl portions 43b are enlarged to increase the assembly strength, the amount of elastic deformation of the engaging pawls 43 is suppressed, and the enlargement of the engaging bores K is suppressed. Thus, the amount by which the engaging wall portions 52c are depressed radially inward from the base flange 52a is suppressed. As a result, the size of the brush holder 8 is reduced without adversely affecting the space for arranging the components on the brush holder 8.

(4) As shown in FIG. 7A, the surface of each engaging wall portion 52c facing the corresponding elastic portion 43a and the associated engaging surface 52b form an acute angle. The engaging surface 52b is inclined upward to the left with respect to the left and right direction in FIG. 7A. In other words, the engaging surface 52b is inclined upward toward the inside of the base member 51. Thus, each pawl portion 43b is engaged with a sharp corner of the corresponding engaging wall portion 52c. As a result, even if a force that separates the retaining member 41 from the base member 51 is suddenly applied to the pawl portions 43b, the pawl portions 43b do not easily separate from the engaging wall portions 52c. This is because the sharp corners of the engaging wall portions 52c easily elastically deform following the deformation of the elastic portions 43a.

(5) As shown in FIG. 7A, when each engaging pawl 43 is engaged with the corresponding engaging wall portion 52c, the retaining member 41 is loosely fit in the base member 51. As shown in FIG. 7B, the retaining member 41 and the base member 51 sandwich the sandwiched parts 61a. The sandwiched parts 61a are elastic, and are arranged between the retaining member 41 and the base member 51 in a compressed state. The sandwiched parts 61a prevent backlash of the retaining member 41 with respect to the base member 51. Thus, although the dimension accuracy of the retaining member 41 and the base member 51 is not highly accurate, the retaining member 41 is easily mounted on the base member 51.

(6) As shown in FIG. 7B, the sandwiched parts 61a are integrally formed with the sealing member 61. Thus, the manufacturing procedure and arranging procedure of the sandwiched parts 61a are easy. When molding the sealing member 61, the sandwiched parts 61a may also be molded integrally with the sealing member 61. Thus, in a case where the brush holder 8 originally includes the sealing member 61, which seals between any two of the brush holder 8, the yoke housing 4, and the gear housing 31, the procedure for manufacturing and mounting the sandwiched parts 61a are unnecessary.

(7) As shown in FIGS. 3 and 7B, the sealing member 61 including the sandwiched parts 61a is integrated with the base member 51. The sealing member 61 is molded as an insert piece of the base member 51. For example, as compared to a case where the sandwiched parts 61a are manufactured separately from the sealing member 61, and the sandwiched parts 61a are assembled to the base member 51 afterward, the first embodiment tightly secures the sandwiched parts 61a to the base member 51.

(8) As shown in FIGS. 2 and 7B the sealing member 61 includes the inner edge 61b, which abuts against the retaining member 41. The inner edge 61b extends in the axial direction. The inner edge 61b suppresses the retaining member 41 from moving with respect to the base member 51 in a direction perpendicular to the axial direction. That is, the inner edge 61b of the sealing member 61 suppresses the retaining member 41 from moving in a direction perpendicular to the compression direction of the sandwiched parts 61a. Thus, the backlash of the retaining member 41 with respect to the base member 51 is further suppressed.

(9) As shown in FIG. 1, the retaining member 41 includes the positioning poles 42, and the gear housing 31 includes the positioning projections 31b. The positioning projections 31b are fitted in the fitting recesses 42a of the positioning poles 42. As a result, the retaining member 41 is prevented from moving in a direction perpendicular to the axial direction of the rotary shaft 10 from the base member 51. Also, the positions of the positioning poles 42 and the positioning projections 31b are highly accurately determined by directly determining the position of the retaining member 41 with respect to the gear housing 31. As a result, the positions of the first brush 9a and the second brush 9b, which are retained by the retaining member 41, are highly accurately determined with respect to the gear housing 31.

That is, the positioning poles 42 and the positioning projections 31b shown in FIG. 1 keep the position of the retaining member 41 constant with respect to the gear housing 31 regardless of the dimension error of the base member 51. Thus, the positions of the first brush 9a and the second brush 9b, which are retained by the retaining member 41, are kept constant with respect to the gear housing 31 and the yoke housing 4. Thus, the dimension error and the assembly error of the retaining member 41 with respect to the base member 51 are prevented from being caused in addition to the dimension error and the assembly error of the base member 51 with respect to the gear housing 31. That is, the positions of the first brush 9a and the second brush 9b are prevented from being displaced with respect to the gear housing 31.

As described above, the positioning poles 42 and the positioning projections 31b shown in FIG. 1 highly accurately determine the positions of the first brush 9a and the second brush 9b with respect to the yoke housing 4 secured to the gear housing 31. Thus, the positioning poles 42 and the positioning projections 31b prevent the positions of the first brush 9a and the second brush 9b from being displaced, and improve the rotational characteristic of the rotary shaft 10. The positioning poles 42 and the positioning projections 31b prevent the displacement of the first brush 9a and the second brush 9b with respect to the magnets 5 secured to the yoke housing 4, and improve the rotational characteristic of the rotary shaft 10.

Also, the positioning poles 42 and the positioning projections 31b highly accurately determine the positions of the second bearing 18, which is retained by the retaining member 41, and the rotary shaft 10, which is retained by the second bearing 18, with respect to the gear housing 31. Thus, the first brush 9a and the second brush 9b are prevented from being displaced with respect to the commutator 7, which is secured to the rotary shaft 10.

(10) As shown in FIGS. 1 and 10, the pair of positioning poles 42 are arranged such that the rotary shaft 10 is located in between. The pair of positioning projections 31b are also arranged such that the rotary shaft 10 is located in between. Thus, with a simple configuration, the position of the retaining member 41 is highly accurately determined with respect to the gear housing 31.

(11) As shown in FIGS. 1 and 10, the positioning poles 42 are located on the first longitudinal end 41b and the second longitudinal end 41c of the retaining member 41. That is, the positioning poles 42 are at part of the retaining member 41 furthest from the rotary shaft 10 as viewed from the axial direction. Thus, the position of the retaining member 41 is most highly accurately determined with respect to the gear housing 31.

(12) As shown in FIG. 5, the base member 51 includes the first conductive terminal 21a and the first coil terminal support portion 52h. As shown in FIG. 6, the retaining member 41 includes the first coil retaining portion 14. As shown in FIGS. 2 and 8, the first coil retaining portion 14 retains the first choke coil 12. The first coil terminal 12a, which extends from the first choke coil 12, is electrically connected to the first conductive terminal 21a at the first connecting portion X1. The first coil terminal support portion 52h supports the first coil terminal 12a between the first coil retaining portion 14 and the first connecting portion X1.

Thus, for example, when fitting an external connector to the connector portion 8c shown in FIG. 2, even if the relative position of the base member 51 with respect to the retaining member 41 is displaced by an external force applied to the base member 51, stress is suppressed from being applied to the first connecting portion X1. As a result, damage to the first connecting portion X1 is prevented. That is, poor connection between the first choke coil 12 and the first conductive member 21 is prevented.

As shown in FIG. 5, the base member 51 includes the second conductive terminal 22a and the first breaker terminal support portion 52j. As shown in FIG. 6, the retaining member 41 includes the breaker retaining portion 17. As shown in FIG. 2, the breaker retaining portion 17 retains the circuit breaker 16, and the first breaker terminal 16a, which extends from the circuit breaker 16, is electrically connected to the second conductive terminal 22a at the second connecting portion X2. The first breaker terminal support portion 52j supports the first breaker terminal 16a between the second connecting portion X2 and the breaker retaining portion 17.

Thus, for example, when fitting the external connector to the connector portion 8c shown in FIG. 2, even if the relative position of the base member 51 with respect to the retaining member 41 is displaced by an external force applied to the base member 51, stress is suppressed from being applied to the second connecting portion X2. As a result, damage to the second connecting portion X2 is prevented. That is, poor connection between the circuit breaker 16 and the second conductive terminal 22a is prevented.

(13) As shown in FIG. 2, the first conductive terminal 21a extends along the first coil terminal 12a and is spot welded to the first coil terminal 12a. The second conductive terminal 22a extends along the first breaker terminal 16a and is spot welded to the first breaker terminal 16a. In the first embodiment, the first coil terminal support portion 52h prevents damage to the first connecting portion X1, and the first breaker terminal support portion 52j prevents poor connection of the second connecting portion X2.

Thus, in the first embodiment, damage to the first connecting portion X1 is prevented without, for example, soldering the first conductive terminal 21a to the first coil terminal 12a in a state where the first coil terminal 12a is inserted in a connection bore formed in the base member 51 to prevent damage to the first connecting portion X1. Likewise, in the first embodiment, damage to the second connecting portion X2 is prevented without soldering the second conductive terminal 22a to the second coil terminal 13a in a state where the second coil terminal 13a is inserted in a connection bore formed in the base member 51. Since the first embodiment employs spot welding, a separate member such as a solder is unnecessary as compared to, for example, soldering.

(14) As shown in FIG. 8, the base member 51 includes the auxiliary support portion 52i, which retains the first coil terminal 12a. The auxiliary support portion 52l and the first coil terminal support portion 52h are arranged such that the first connecting portion X1 is located in between. That is, the auxiliary support portion 52i supports the distal end of the first coil terminal 12a. When the first coil terminal 12a is mounted on the first coil terminal support portion 52h and the auxiliary support portion 52i before welding the first coil terminal 12a to the first conductive terminal 21a, the first coil terminal 12a is prevented from being displaced from the first conductive terminal 21a before welding. Thus, welding is easily and reliably performed.

(15) As shown in FIGS. 2 and 4, the retaining member 41 includes the first through window 44, the second through window 45, and the third through window 46. As shown in FIG. 2, as viewed from the axial direction, the first through window 44 overlaps the first coil terminal 12a, and the second through window 45 overlaps the first breaker terminal 16a, and the third through window 46 overlaps the second breaker terminal 16b and the second coil terminal 13a. Thus, the first connecting portion X1 is welded by the welding jigs inserted in the first through window 44. The second connecting portion X2 is welded by the welding jigs inserted in the second through window 45. The third connecting portion X3 is welded by the welding jigs inserted in the third through window 46. Therefore, welding operations are easy. For example, as compared to a case where the first connecting portion X1 to the third connecting portion X3 are welded by bringing the welding jigs closer from the radially outward position of the brush holder 8, the first embodiment easily reduces the size of the brush holder 8.

(16) As shown in FIG. 2, the first coil terminal support portion 52h and the auxiliary support portion 52i extend through the first through window 44. The first breaker terminal support portion 52j extends through the second through window 45. The second coil terminal support portion 52k and the second breaker terminal support portion 52l extend through the third through window 46. Thus, while preventing the first connecting portion X1 to the third connecting portion X3 from being displaced, the retaining member 41 easily engages with the base member 51.

Figure 12:
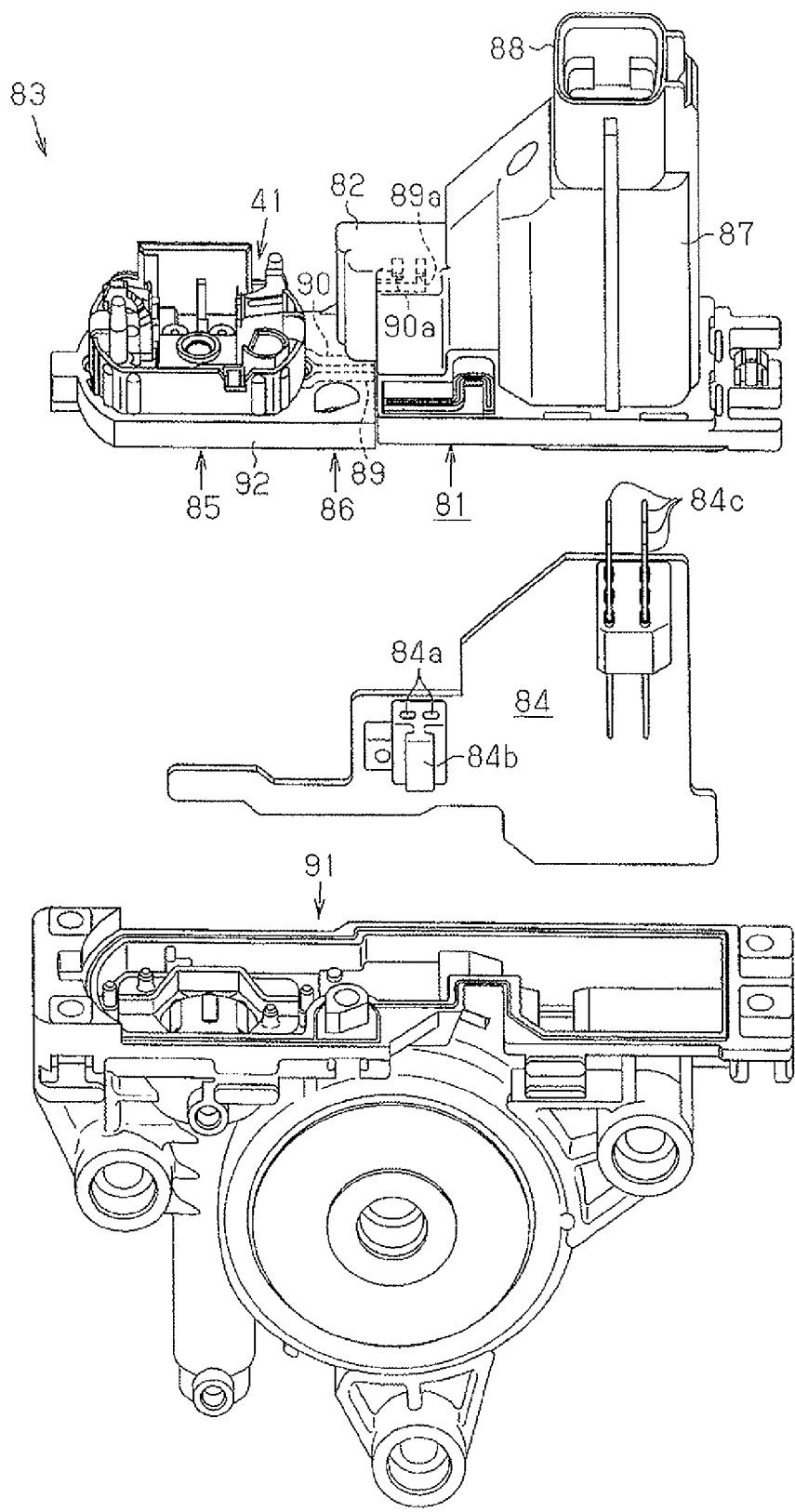
FIG. 12 is an exploded perspective view illustrating a direct-current motor according to a second embodiment of the present invention.

FIG. 12 shows a second embodiment of the present invention. The brush holder of the second embodiment includes a base member 81 and the retaining member 41. The retaining member 41 in FIG. 12 is the same as the retaining member 41 of FIG. 1 to FIG. 11. The base member 81 and a gear housing 91 accommodate a control circuit board 84 sandwiched in between. The control circuit board 84 performs, for example, a known pinch preventing control of the vehicle power window.

As shown in FIG. 12, the base member 81 includes a base portion 85, a base extended portion 86, an internal connector portion 82, a board accommodating portion 87, and an external connector portion 88. The base portion 85 is the same as the base portion 52 of FIGS. 1 to 11, and the retaining member 41 is mounted on the base portion 85. The base extended portion 86 extends rightward in FIG. 12 from the longitudinal end of the base portion 85. The internal connector portion 82 is located at the distal end of the base extended portion 86. The board accommodating portion 87 and the external connector portion 88 are located further rightward of the internal connector portion 82 in FIG. 12.

The shape of a sealing member 92 in FIG. 12 matches with the shape of the base extended portion 86. The sealing member 92 functions in the same manner as the sealing member 61 of FIGS. 1 to 11, and covers the base portion 85 and the base extended portion 86.

A first conductive member 89 shown in FIG. 12 includes a conductive terminal (not shown), which is the same as the first conductive terminal 21a of FIGS. 1 to 11, at the base portion 85. A second conductive member 90 includes a conductive terminal (not shown), which is the same as the second conductive terminal 22a of FIGS. 1 to 11, at the base portion 85. The first conductive member 89 and the second conductive member 90 extend through the interior of the base portion 85 and the base extended portion 86 to the internal connector portion 82. The first conductive member 89 includes a first conductive terminal 89a, which is located at the internal connector portion 82, and the second conductive member 90 includes a second conductive terminal 90a, which is located at the internal connector portion 82. The first conductive terminal 89a and the second conductive terminal 90a extend toward the gear housing 91.

The shape of the gear housing 91 corresponds to the shape of the base member 81, and the gear housing 91 is capable of closing the opening of the internal connector portion 82 and the opening of the board accommodating portion 87. The internal connector portion 82, the board accommodating portion 87, and the gear housing 91 are capable of accommodating the control circuit board 84. The control circuit board 84 includes a board connector 84b, which is electrically connected to the internal connector portion 82. The board connector 84b includes a pair of female terminals 84a, which are electrically connected to the first conductive terminal 89a and the second conductive terminal 90a. The control circuit board 84 further includes external terminals 84c, which are arranged inside the external connector portion 88. For example, a vehicle connector, which extends from the vehicle, is electrically connected to the external connector portion 88. The second embodiment has the same advantages as the first embodiment.

The above-mentioned embodiments may be modified as follows.

The engaging pawls 43 shown in FIGS. 6 and 7A do not need to extend in the axial direction along the outer circumferential wall 41a of the retaining member 41, but may be arranged radially inward of the outer circumferential wall 41a of the retaining member 41. In this case, the positions of the engaging wall portions 52c and the engaging bores K are changed in accordance with the position of the engaging pawls 43.

The engaging surface 52b shown in FIG. 7A and the surface of the engaging wall portion 52c that faces the elastic portion 43a do not need to form an acute angle, but may form a right angle. Also, in the configuration where the engaging surface 52b is inclined as shown in FIG. 7A, the pawl portion 43b may be inclined to extend along the engaging surface 52b.

The sandwiched parts 61a shown in FIG. 7B may be omitted from between the retaining member 41 and the base member 51.

The sandwiched parts 61a shown in FIG. 7B do not need to be formed integrally with the sealing member 61, but may be manufactured as elastic members separate from the sealing member 61, and be mounted on the sealing member 61. The position and the number of the sandwiched parts 61a may be changed as required.

The sealing member 61 does not need to be formed integrally with the base member 51, but may be manufactured separately from the base member 51 and be mounted on the base member 51.

The inner edge 61b of the sealing member 61 shown in FIG. 7B does not need to be the only elastic engaging portion, which abuts against the retaining member 41 to prevent the retaining member 41 from moving in a direction perpendicular to the compression direction of the sandwiched parts 61a. The sealing member 61 may include elastic engaging portions beside the inner edge 61b.

The shape, number, and position of the positioning poles 42 and the positioning projections 31b shown in FIG. 1 may be changed as required. Furthermore, instead of the positioning poles 42 and the positioning projections 31b, a configuration for determining the position of the retaining member 41 with respect to the gear housing 31 may be formed.

The first coil terminal support portion 52h and the first breaker terminal support portion 52j shown in FIG. 2 may be omitted from the base member 51.

The first conductive terminal 21a shown in FIG. 2 does not need to extend along the first coil terminal 12a and be spot welded to the first coil terminal 12a. The second conductive terminal 22a also does not need to extend along the first breaker terminal 16a and be spot welded to the second coil terminal 13a. For example, connection bores may be formed in the base portion 52, and the first coil terminal 12a and the first breaker terminal 16a may be inserted in the connection bores. Then, the first conductive terminal 21a may be soldered to the first coil terminal 12a, and the second conductive terminal 22a may be soldered to the first breaker terminal 16a.

The first conductive terminal 21a, the second conductive terminal 22a, the first coil terminal 12a, and the first breaker terminal 16a shown in FIG. 2 do not need to be arranged in a direction perpendicular to the axial direction, but may be arranged in the axial direction. The first coil terminal support portion 52h and the first breaker terminal support portion 52j may include a pair of retainers, which extend in a direction perpendicular to the axial direction.

The auxiliary support portion 52i shown in FIG. 2 may be omitted from the base member 51.

As shown in FIG. 2, the electrical component electrically connected to the first brush 9a is not necessarily the first choke coil 12. Likewise, the electrical component electrically connected directly or indirectly to the second brush 9b is not necessarily the second choke coil 13 and the circuit breaker 16, but may be, for example, a capacitor for suppressing electrical noise. That is, the component terminals electrically connected to the first conductive terminal 21a and the second conductive terminal 22a do not need to be the first coil terminal 12a and the first breaker terminal 16a. The base member 51 may include terminal support portions for supporting terminals of electrical components other than the first choke coil 12, the second choke coil 13, and the circuit breaker 16.

The first conductive member 21 and the second conductive member 22 shown in FIG. 2 do not need to be insert molded to the base member 51, but may be mounted on the base member 51.

The direct-current motor 1 shown in FIG. 1 does not need to be a drive source of the power window apparatus, but may be used for a drive source of other apparatus.

The invention claimed is:

1. A direct-current motor, comprising:
a yoke housing:
a rotary shaft rotatably accommodated in the yoke housing:
a gear housing secured to the yoke housing;
a speed reducing mechanism accommodated in the gear housing, the speed reducing mechanism reduces rotation speed of the rotary shaft and transmits the rotation;
a commutator secured to the rotary shaft to rotate integrally with the rotary shaft;
a brush, which slides against the commutator; and
a brush holder retaining the brush,
the brush holder including:
a retaining member that retains the brush and is accommodated in the yoke housing, wherein the retaining member and the gear housing each have a positioning portion, the positioning portions being engaged with each other so as to prevent the retaining member and the gear housing from being moved with respect to the each other in a direction perpendicular to the axial direction of the rotary shaft; and
a base member loosely fitted to the retaining member, wherein the base member is located between the gear housing and the retaining member and has a connector portion, wherein the base member having an insertion bore, a diameter of the insertion bore is greater than that of any one of the positioning portions, in a state where the retaining member is mounted on the base member, at least one of the positioning portion of the retaining member and the positioning portion of the gear housing extends through the insertion bore and both of the positioning portions engage with each other.

2. The direct-current motor according to claim 1, wherein the retaining member has a bearing retaining portion that retains a bearing for rotatably supporting the rotary shaft.

3. The direct-current motor according to claim 1, wherein each positioning portion is one of a pair of positioning portions that are arranged so as to sandwich the rotary shaft.

4. The direct-current motor according to claim 3, wherein the positioning portion of the retaining member is located in a part of the retaining member, the part being furthest from the rotary shaft as viewed from the axial direction of the rotary shaft.

5. The direct-current motor according to claim 1, wherein the brush holder includes an elastic member sandwiched between the retaining member and the base member while being compressed.

* * * * *